Oct. 23, 1945.  H. D. GREEN  2,387,577
PRODUCTION OF HYDROCYANIC ACID
Filed Sept. 20, 1943
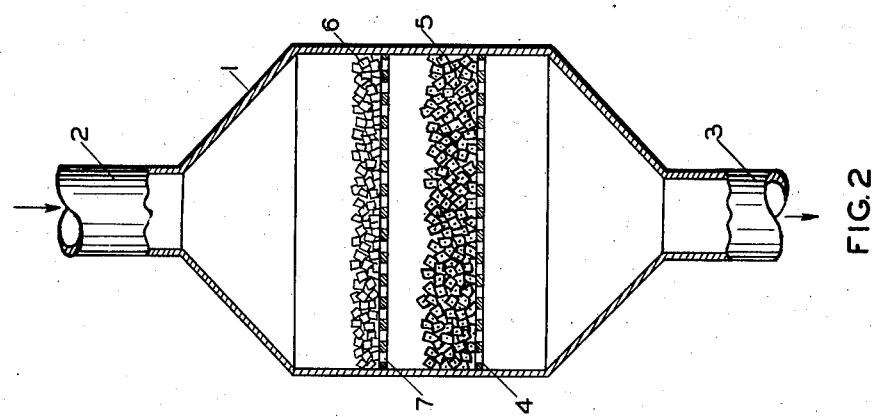
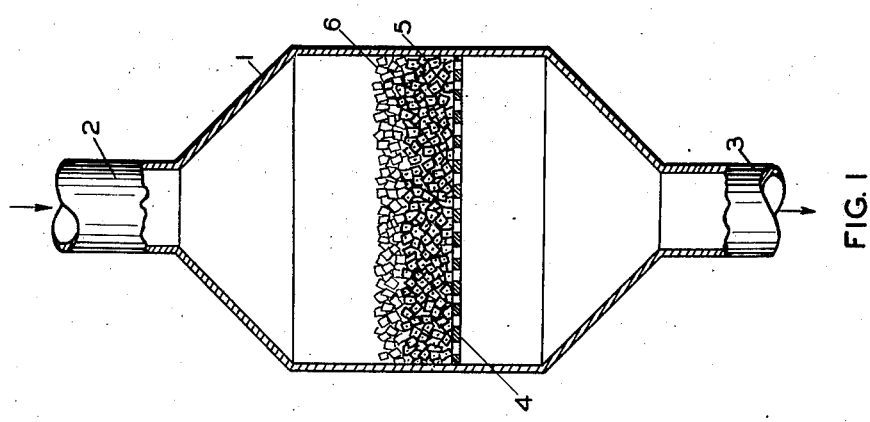
HOWARD DONOVAN GREEN
*INVENTOR.*
BY
ATTORNEY Patented Oct. 23, 1945

2,387,577

UNITED STATES PATENT OFFICE 2,387,577

PRODUCTION OF HYDROCYANIC ACID

Howard Donovan Green, Altadena, Calif., assignor to E. I. du Pont de Nemours & Company, Wilmington, Del., a corporation of Delaware Application September 20, 1943, Serial No. 503,077

6 Claims. (Cl. 23—151)

This invention relates to the production of hydrocyanic acid, particularly by the catalytic reaction between nitric oxide and a hydrocarbon.

A known process for making hydrocyanic acid comprises reacting nitric oxide wtih a hydrocarbon in the vapor phase in the presence of a platinum metal catalyst. Such process is described, for example, in the U. S. patents Lacy, 2,076,953 and Bond et al., 2,083,824. By way of example, one method of carrying out this process is to oxidize ammonia to nitric oxide by reacting with an excess of air in the presence of a platinum metal catalyst, thus producing a hot, gaseous mixture of nitric oxide, excess air, and water vapor. While still hot, this ammonia oxidation mixture is mixed with an excess of hydrocarbon gas or vapor, for example, natural gas, butane or the like, and this mixture is passed directly over a platinum metal catalyst. According to the above-mentioned patents, a preferred catalyst is an alloy of platinum and rhodium, containing 10 to 20% of rhodium. In one method of practicing this process, the platinum metal catalyst used for the reaction between the nitric oxide and the hydrocarbon is supported on a non-porous refractory material such as vitreous silica or a natural occurring, non-porous refractory such as quartz, beryl or the like. Methods for preparing such supported catalysts are disclosed in the aforesaid Patent 2,083,824.

The present invention relates to an improvement in the above-described process when it is operated with a catalyst made by supporting a platinum metal or platinum metal alloy on the surface of a non-porous, refractory material. I have discovered that the catalytic effect of such a catalyst is promoted and thereby the yield of hydrocyanic acid is markedly increased by utilizing the procedure and catalyst arrangement disclosed below. The objects of the present invention, therefore, include an improved method for producing hydrocyanic acid by reacting nitric oxide with hydrocarbons, a method for promoting the catalytic effect of a catalyst which comprises a platinum metal supported on a non-porous, refractory material such as vitreous silica or beryl, and the provision of a novel catalyst mass for carrying out reaction between nitric oxide and hydrocarbons. Other objects will be apparent from the following description.

The above objects are attained in accordance with my invention by passing the hot mixture of nitric oxide and hydrocarbon through a mass of granular, non-porous, refractory material which is substantially free of the platinum metal catalyst, and thence passing the hot gases through or over a catalyst mass which comprises a platinum metal or alloy supported on a non-porous, refractory material. The same or a different refractory material may be used for the promoter bed and for the platinum metal catalyst bed, as desired. It is essential, however, that the refractory material in both beds be substantially non-porous in character and sufficiently refractory to withstand the reaction temperatures, which will be in the neighborhood, for example, of 1100 to 1400° C. For this purpose I have found, for example, non-porous varieties of beryl (a naturally occurring beryllium aluminum silicate), fused or vitreous silica and fused or vitreous alumina to be satisfactory.

I have determined that the effect of the non-porous, refractory overlayer is to promote the catalytic activity of the supported platinum metal catalyst and is not merely due to the cumulative effect of a double layer of catalyst. This is shown by the fact that the herein-described results cannot be obtained by merely increasing the thickness of the supported platinum metal catalyst layer. Also, the non-porous, refractory material, not coated with platinum metal, when used alone has practically no catalytic effect on the reaction between nitric oxide and a hydrocarbon to produce hydrocyanic acid.

The appended drawing, which illustrates in a diagrammatical manner types of apparatus and catalyst arrangement which may be utilized in practicing my invention, is a vertical cross section of reactors charged with catalyst.

Referring to Figure 1, catalyst chamber 1 is provided with a foraminous ceramic grid 4, on which is placed a layer of granular, non-porous, refractory material 5, coated with platinum metal. As an example, this catalyst layer 5 may be composed of crushed beryl of about 10 mesh size which has been coated with a platinum-rhodium alloy according to the method described in U. S. P. 2,083,824. The depth of catalyst layer 5 may vary depending upon conditions such as size and shape of the reactor, rate of gas flow, size of the granules, and the like. Generally, it will be from 0.5 to 2 inches deep. A layer 6 of granular, refractory material which does not contain any of the platinum metal catalyst is placed over the top and rests upon catalyst layer 5. This overlayer of non-porous, refractory material preferably will be from 2 to 3 inches in depth but may vary from 0.5 to 6 inches in depth. It may have a particle size equal to or different from that employed in the catalyst layer and it may be composed of the same or different refractory material. The apparatus is also provided with gas inlet pipe 2 and gas outlet pipe 3 so that the gases passing through the apparatus pass first through overlayer 6 and then through catalyst layer 5 before leaving the apparatus.

Figure 2 represents another modification of my invention wherein the overlayer and catalyst layer are separated by a gas space. In this case the reaction vessel 1 is provided with two grids 4 and 7 which are similar in construction to grid 4 of Figure 1. The catalyst layer 5 is supported by grid 4 and the overlayer 6 is supported by the additional grid 7. The flow of gases through the apparatus is the same as in Figure 1, i. e. in through pipe 2 and out through pipe 3.

In practicing my invention, I follow the procedures disclosed in the aforesaid Patents 2,076,953 and 2,083,824 in preparing the gas mixture which is fed into the catalyst chamber, for example, through pipes 2 in Figures 1 and 2 as described above. In this manner I have tested my invention by first passing the gases through a catalyst comprising a platinum metal supported on a non-porous refractory and then in the same apparatus through the same catalyst which has been provided with an overlayer of non-porous, refractory material which is free from platinum metal catalyst, for example, as illustrated by the drawing. In carrying out such tests, I have found that the use of the overlayer results in an increase in yield of from 5 to 10%, based on the amount of nitric oxide converted to hydrocyanic acid.

For example,

Example 1

Ammonia was oxidized by passing it with an excess of air over a platinum wire gauze catalyst so as to obtain a hot mixture of nitric oxide, water vapor and excess air. This hot mixture, together with natural gas in the proportion of about two moles of the hydrocarbon to one mole of the ammonia used, was passed through a layer, one inch deep, of a catalyst consisting of crushed beryl of about 6 to 10 mesh size which had been coated with an alloy consisting of 20% rhodium and 80% platinum. The average yield obtained, based on the amount of ammonia used, was 68%. The same procedure then was followed, except that the layer of supported platinum-rhodium alloy catalyst was covered with an overlayer, one inch deep, of granular beryl of the same mesh size used for the catalyst. With this arrangement, the average yield of hydrocyanic acid was found to be 75%, based on the amount of ammonia used.

Example 2

The reaction of Example 1 was carried out, using the catalyst arrangement shown in Figure 2 of the drawing; that is, an overlayer of the crushed beryl material was placed on a separate grid and supported 2 to 3 inches above the catalyst layer and the reaction gases were passed down through the suspended overlayer and thence through the catalyst layer. When only the catalyst was used without the overlayer, the maximum yield of hydrocyanic acid was 58%, whereas with the overlayer suspended above the catalyst bed, the maximum yield was 69%.

In practicing my invention, the non-porous, refractory material used must be capable of withstanding temperatures of from 1100 to 1400° C., substantially without disintegration. The refractory material should be free from or contain not more than small traces of catalyst poisons or materials which have undesirable catalytic effects, for example, iron, nickel, cobalt, manganese, molybdenum, chromium, lead, copper, zirconium, or compounds thereof. The presence of such materials does not necessarily make my improvement inoperative, but it is generally desirable to avoid the presence of such catalyst poisons or anticatalysts in making HCN by the catalytic reaction of nitric oxide with hydrocarbons, with or without my improvement. I generally prefer to use beryl, vitreous fused quartz, or vitreous fused alumina as the non-porous, refractory material.

The mesh size of the particles used as catalyst support and as the overlayer is not particularly critical. In accordance with well-known principles, I generally select a particle size which will afford the least possible resistance to flow of the gases through the mass and at the same time afford a suitably large surface.

In practicing my invention, I have found that best results are obtained by maintaining at least a major portion of the overlayer and gases in contact therewith, at a temperature not higher than 800° C. and therefore prefer to so operate. At higher temperatures, undesirable side reactions tend to occur in the overlayer, accompanied by lower yields of hydrocyanic acid. The temperature of the overlayer can be controlled by various means obvious to the skilled engineer, for example, by control of the temperature and velocity of the incoming gases, or by the provision of conventional heat removal means. As the gases pass on into contact with the platinum metal catalyst the temperature of the reacting gases generally will rise above 800° C., e. g., to around 1000° C. or higher.

Various methods of carrying out the step of oxidizing ammonia and the conditions of temperature, pressure and the like and various proportions of diluent gases such as water vapor, oxygen and nitrogen in the reaction mixture are the same in my process as in the methods described by the aforesaid patents to Lacy and Bond et al. and need not be further described here. By way of example, however, good yields of hydrocyanic acid may be carried out by the following procedure: A mixture of one volume of ammonia and 8 to 10 volumes of air is reacted in the presence of a platinum-rhodium wire gauze catalyst to produce a hot mixture of gases containing nitric oxide, nitrogen, oxygen and water vapor having a temperature of about 850 to 1000° C. This hot gas is mixed with a hydrocarbon gas or vapor, and cooled if necessary to produce a mixture containing about 2 volumes of hydrocarbon for each volume of nitric oxide present and having a temperature of 400 to 600° C. This hot mixture is immediately passed into contact with the catalyst, which comprises the non-porous, refractory material coated with a platinum metal, at a reaction temperature of around 1000 to 1100° C. In adapting my improvement to this process, the hot gases first are brought into contact with the non-porous refractory which is substantially free from platinum metal and thence into contact with the refractory coated with platinum metal.

I claim:

1. In a process for the production of hydrocyanic acid by catalytically reacting nitric oxide with a hydrocarbon in the vapor phase, the step comprising flowing the reacting gases through two adjacent layers of granular, substantially non-porous, refractory material, the layer first contacted by the gas being substantially free from a catalyst for the reaction and the other layer being coated with a platinum metal, the temperature of the gases in contact with said first layer being not higher than 800° C.

2. The process according to claim 1 in which the layer first contacted by the gas is about 0.5 to 6 inches thick.

3. The process according to claim 1 in which the granular, refractory material is beryl.

4. The process according to claim 1 in which the granular, refractory material is vitreous silica.

5. The process according to claim 1 in which the granular, refractory material is vitreous alumina and the platinum metal is a platinum-rhodium alloy.

6. The process for the production of hydrocyanic acid by catalytically reacting nitric oxide with a hydrocarbon which comprises flowing a gaseous mixture containing nitric oxide, nitrogen, water vapor and hydrocarbon at a temperature of about 400 to 600° C. downwardly through a catalyst body composed of a layer of granular, substantially non-porous, refractory material coated with platinum metal, surmounted by an overlayer, 0.5 to 6 inches thick, of substantially non-porous, refractory material which is substantially free from platinum metal.

HOWARD DONOVAN GREE .